United States Patent [19]
Haslop

[11] Patent Number: 5,447,335
[45] Date of Patent: Sep. 5, 1995

[54] SECURITY DEVICE AND AUTHENTICATABLE ITEM

[75] Inventor: John M. Haslop, Woodley, England

[73] Assignee: Thomas De La Rue Limited, London, England

[21] Appl. No.: 50,181

[22] PCT Filed: Nov. 22, 1991

[86] PCT No.: PCT/GB91/02069

§ 371 Date: Jun. 10, 1993

§ 102(e) Date: Jun. 10, 1993

[87] PCT Pub. No.: WO92/09444

PCT Pub. Date: Jun. 11, 1992

[30] Foreign Application Priority Data

Nov. 22, 1990 [GB] United Kingdom ............... 9025390

[51] Int. Cl.⁶ .............................................. B42D 15/00
[52] U.S. Cl. ........................................................ 283/91
[58] Field of Search ................. 283/86, 91, 92, 901, 283/117

[56] References Cited

U.S. PATENT DOCUMENTS

| 4,568,141 | 2/1986 | Antes | 283/91 X |
| 4,968,064 | 11/1990 | Marcuso | 283/91 |
| 5,032,003 | 7/1991 | Antes | 283/91 X |
| 5,101,184 | 3/1992 | Antes | 280/91 X |
| 5,344,192 | 9/1994 | Phillips | 283/91 |

FOREIGN PATENT DOCUMENTS

| 0201323 | 5/1986 | European Pat. Off. . |
| 0105099 | 11/1988 | European Pat. Off. . |
| 0435029A2 | 12/1990 | European Pat. Off. . |
| 2515396 | 10/1982 | France . |
| 2093404 | 2/1982 | United Kingdom . |
| 2108428 | 10/1982 | United Kingdom . |
| WO90/07133 | 6/1990 | WIPO . |
| WO91/03747 | 3/1991 | WIPO . |

OTHER PUBLICATIONS

"Optical Interference Coatings for Inhibiting of Counterfeiting", J. A. Dobrowolski et al, *Optica Acta*, 1973, vol. 20, No. 12, pp. 925–937.

*Primary Examiner*—Willmon Fridie
*Attorney, Agent, or Firm*—Oliff & Berridge

[57] ABSTRACT

An authenticatable item and security device carry a number of symbols (4A, 4B, 4C, 6A, 6B, 6C) identifiable to the naked eye, there being at least two sets of at least three symbols. All the symbols within a set are substantially identical, are positioned in a non-overlapping, regular geometric arrangement, and at least one common viewing angle of inclination, exhibit substantially the same optical performance, the optical performance varying with inclination viewing angle.

31 Claims, 7 Drawing Sheets

SECURITY DEVICE AND AUTHENTICATABLE ITEM

The invention relates authenticatable items such as security documents, for example banknotes, and to security devices for fixing to such authenticatable items to provide authentication and protection against fraudulent reproduction of the item.

Optically variable devices such as holograms and diffraction patterns are used widely on financial transaction cards and the like for authentication purposes and protection against fraudulent reproduction. Banknotes bearing single holographic images have been issued by a few countries including Australia and Austria. The use of such devices on substrates such as banknotes which flex during handling has been relatively limited, however. This limitation is due to a number of reasons and includes the aesthetic requirement for flatness required for viewing a hologram of a complete object, which is generally difficult to achieve with a flexible substrate such as a banknote which is regularly crumpled in use.

A further limitation arises from the uneven, fibrous structure of paper substrates which causes minute local contouring effects to be imparted to hot stamped holograms.

WO90/07133 published on the 28th Jun. 1990 describes the crinkling problems which are encountered particularly with banknotes and a solution to this problem of providing a two dimensional optical catastrophe image diffraction pattern. In other words, a rather unusual and complex diffraction pattern is created to overcome the problem.

U.S. Pat. No. 4,568,141 also addresses the problems of providing security devices on documents and in particular the problems arising from the crumpling of such documents. In this case, the solution is to provide a set of adjacent diffraction gratings arranged along a track such that when the document is rotated a special colour pattern is generated by the successive plain diffraction grating blocks.

Another security device for use with banknotes and the like is described in GB-A-2093404 and once again use is made of diffraction gratings designed to separate incident polychromatic light into at least a pair of adjacent, separate and distinct reflective beams of contrasting colours. The diffracting grating structures are produced by embossing a metallised structure in which there is a diffractive grating of one type set in a background of a colour contrasting grating. The use of two (or more) such structures is mentioned.

GB-A-2108428 describes a security device which is designed to be machine-readable and to be concealed from the naked eye. The device, in one example, comprises a number of identical holograms which, when scanned, cause diffraction maxima to occur in a pretermined sequence. These maxima can be detected and compared with a reference by a suitable reading machine to determine whether the document to which the device is fixed is authentic.

In accordance with the present invention, we provide an authenticatable item carrying a number of symbols identifiable to the naked eye, there being at least two sets of at least three symbols, wherein all the symbols within a set are substantially identical, are positioned in a non-overlapping, regular geometric arrangement, and at at least one common viewing angle of inclination, exhibit substantially the same optical performance, the optical performance varying with inclination viewing angle.

The invention provides an authenticatable item and a security device which enable a relatively untrained user easily to verify the authenticity of the device or item while at the same time the device can be used in conjunction with flexible documents, such as banknotes, which are subject to crumpling so that immediate authentication recognition can occur given that the entire device may not be visible at any one time, or facets may be presented at uncommon angles.

Thus even if the surface on which the security device is fixed is crumpled, there will be at least one complete symbol still readily visible which will be sufficient for authentication purposes; and secondly by using easily identifiable symbols (i.e. attractive graphical or pictorial images) of this particular type instead of plain diffraction pattern effects, it is much easier to determine authenticity.

In some cases, the symbols can be applied individually to the authenticatable item, for example by embossing or any other technique mentioned below. However, conveniently the symbols are provided on a common substrate which is affixed in the form of a security device to the authenticatable item.

In accordance with a second aspect of the present invention we provide a security device for mounting to an authenticatable item, the security device carrying a number of symbols identifiable to the naked eye, there being at least two sets of at least three symbols, wherein all the symbols within a set are substantially identical, are positioned in a non-overlapping, regular geometric arrangement, and at at least one common viewing angle of inclination, exhibit substantially the same optical performance, the optical performance varying with inclination viewing angle.

A typical security device according to the invention will have dimensions of 2.5 cm×2.5 cm.

By a "symbol" we mean a prominent, readily recognisable, individual symbol the angularly variable appearance of which indicates to the viewer that the item of which it forms a part is authentic. Examples of symbols include letters, numbers, logos, geometric, graphical, pictorial or other shapes, or three dimensional objects, and combinations and multiples thereof.

It has been found that relatively simple diffracting areas presented as graphical shapes such as human or animal head outlines, plants, flowers, trees and even circles, squares and triangles can be used to provide readily recognisable and thus authenticatable symbols. Even after significant crumpling, a security device or item carrying symbols of this type surprisingly presents an authenticatable and attractive appearance arising from the multiplicity of perceived coloured images and interacting shapes formed by the diffraction or interference of other symbols presented at different angles and inclinations.

The symbols in a set need not necessarily be exactly identical. For example, the symbols may vary regularly geometrically in their relative sizes and in this case in one preferred arrangement, the symbols in the set are arranged in a line with the sizes of successive symbols decreasing regularly geometrically along the line. In addition, or alternatively, the symbols in the set may appear in different regularly varying orientations. For example two symbols may be constructed around a two fold axis of symmetry. Alternatively mirror reflections may be employed.

A further advantage of using relatively simple pictorial shapes is that the image quality does not so significantly appear to deteriorate as a result of the effects of substrate fibres which may be impressed into the device on affixing under pressure.

The symbols of one set should not overlap although it is possible and in many cases desirable for the symbols of one set to overlap the symbols of another. This would be acceptable particularly where the symbols of one set are viewable at an angle of inclination at which the symbols of the other set are not viewable and vice versa.

Preferably, however, each symbol of one set overlaps at most one symbol of another set. In other words, a symbol of one set should not provide a continuous bridge between a pair of symbols in a second set. Where symbols of two sets overlap, it is particularly preferable that the symbols of the two sets exhibit mutually opposed variations in optical performance as the viewing angle of inclination varies. Thus, at one angle of inclination, one of the symbols is visible while at another angle of inclination the other symbol is visible with possibly an intermediate angle of inclination enabling both symbols to be viewed simultaneously.

In one arrangement, four sets of symbols are provided, the symbols of the first and third sets being the same but viewable at first and second angles of inclination respectively, the symbols of the second and fourth sets being the same and different from the symbols of the first and third sets, the symbols of the second set being viewable at the same angle as the symbols of the first and the symbols of the fourth set being viewable at the same angle as the symbols of the third set, and wherein the symbols of the first and second sets are superposed and the symbols of the third and forth sets are superposed whereby tilting the item or security device between the viewing angles of inclination of the sets provides the appearance of a switching effect between the two symbols.

In preferred examples, the symbols of the sets are juxtaposed so as to define a number of composite symbols or symbol clusters which may be recognisable in their own right. For example, individual symbols defining a head and shoulders respectively may be juxtaposed to provide a composite symbol representing a bust.

In the case of composite symbols formed by the juxtaposition of symbols from different sets, the separation between the individual symbols is less than the separation between the composite symbols so that each composite symbol can be perceived as a separately identifiable entity. For design purposes symbols may exhibit a minimal degree of contact from one symbol to another (whether of the same or a different set) or minimal intersection such as the heads and tails of adjacent symbols touching.

In general, the symbols of one set will be different from the symbols of the other set but it is also possible for the symbols in both sets to be the same. Furthermore, it is envisaged that at least one symbol could be common to both sets, particularly if the symbols are arranged in two intersecting lines. However, preferably there are at least six symbols provided on the item or device, typically six to forty symbols.

By presenting two, three, four, five, or more sets of symbols whether the same or substantially identical but for a regular variation, and whether in the same order or reversed order or mirror order or centrosymmetric order, the authenticatable item is given a plurality of sets of substantially identical symbols. This considerably increases the redundancy of symbols and provides an added level of security. The viewer may then identify the article not only by reference to individual symmbols and their sets but by combinations of symbols of different types.

Preferably, the symbols are identifiable to the unassisted naked eye although in some cases the assistance of low level magnification, for example $\times 30$, is envisaged.

In general, the symbols in a set will be substantially equally spaced from one another defining a regular geometric arrangement but it is to be understood that this also includes other regular arrangements, for example a spiral arrangement in which the separation between symbols gradually changes, e.g. increases.

Although the symbols in one set should be viewable at at least one common viewing angle of inclination, it is envisaged that the symbols in a set may not all be viewable at the same time from the same orientation or rotational position. Thus, in order to see all the symbols in a set, it may be necessary to rotate the substrate on which the symbols are provided while maintaining the same angle of inclination to the eye. Preferably, in this case, the symbols in a set exhibit substantially the same optical performance at regularly spaced relative angles of rotation about a perpendicular to the plane of the item or device.

The symbols exhibit an optical performance which varies with the inclination viewing angle. There are various ways in which this optical performance may be achieved. The preferred method makes use of diffraction effects. These include the use of diffraction gratings with regular line spacings of either the monodirectional or bidirectional type. With the monodirectional type, the optical performance varies with inclination angle at one particular rotational position whereas with bidirectional diffraction gratings, the optical performance varies with inclination angle at two angles of relative rotation, usually orthogonal. The latter type of diffraction grating is particularly preferred. Other diffraction effects make use of diffraction gratings with irregular line spacings to achieve object holograms and computer generated diffracting patterns; while further diffraction effects include diffractive mosaics of complementary areas of diffracting areas such as in the kinegram in which the diffraction from area to area gives the perception of moving colour bands when the device is tilted, miniature pixels (such as in WO91/03747) and optical catastrophe image diffraction patterns (such as WO90/07133), and unresolvable mosaics of diffractive gratings.

The symbol generating element if diffractive will normally be an optically diffracting surface relief pattern replicated into a material such as a transparent polymeric composition with such a transmission hologram made viewable in reflection by the provision of a reflective layer such as a complete layer of conforming metal which provides mirror reflectivity and opacity. The diffractive structure may also be rendered partially transparent so that for example any underlying security printing can be observed, by treating the relief patterned surface with a very thin (e.g. a quarter white light wavelength) thickness of metal, providing a halftone screen like pattern of dots of metal which dots are not resolved by the eye or providing a thin light refracting coating as taught in EP 201323A.

Symbols could also be generated from optical interfering structures such as multilayer interference coatings of for example the dielectric type (having alternating layers of materials exhibiting low and high refractive indices) and the metal-dielectric type (having a bottom layer of reflecting metal, a middle layer of dielectric material and a top layer of thin partially transparent metal). Such structures are described in "Optical Interference Coatings for Inhibiting of Counterfeiting" by Dobrowolski et al, Optica Acta 1973, vol 20, no 12 pp 925–937.

Further the symbol could be generated from liquid crystal effects as described for example in EP-A-435029.

The symbols will thus normally be positively generated but it is envisaged that in some cases, the symbols could be defined by a surrounding, optically variable background.

In general, the symbols of each set at the at least one common viewing angle of inclination will have the same colour.

The symbols will typically be created on an optical bench by means of off axis laser interference recording so that diffracting graphical patterns can be formed or object holograms can be eventually reconstructed. After holographic origination is completed on the optical bench the photoresist surface is then developed to provide a surface relief pattern which is generally replicated by electroforming a nickel plate on the photoresist surface. This nickel replica can then be used directly or more commonly indirectly to produce further generations of replicas which are used to impart the three dimensional diffracting surface into the polymeric layer. The layer must then be treated, eg metallised, although thinly metallised plastic may itself be embossed. Alternatively diffracting surface replication may be achieved by radiation curing of monomers with subsequent metallisation. Embossed thermoplastic films may be coated with heat activatable adhesives and applied to the substrate under pressure optionally with a graphically outlined blocking dye so as to achieve transfer of the diffractive material according to the area blocked.

As an alternative to origination of images on the optical bench, computer controlled electron beam recording may be employed.

The devices of principal interest for visual authentication will be viewable in white light.

Two or more diffraction gratings may be used to define complementary or juxtaposed symbols from different sets to form a complex composite graphical symbol. Thus a typical composite symbol may include intersecting broad perimeters of a triangle and a differently diffracting circle. This may be presented as two overlapping symbols which diffract differently in orthogonal direction of viewing. Alternatively one may appear to be in front of the other, this varying with the tilting angle.

As a further embodiment more complex composite symbols may be created by conducting origination on an optical table. Thus, at least some of the composite symbols may present the appearance of a pair of two dimensional symbols (from different sets) which move relative to one another as the viewing angle varies. Such symbols can arise from a planar but finely embossed diffracting surface giving the perception of depth. Thus there may be seen a first symbol which overlaps a second symbol defining together a composite symbol. The second symbol can appear to be in an underlying plane which moves relative to the first symbol when the device or item is tilted on viewing. Such composite symbols include so called two dimensional-three dimensional graphical diffractive images. If necessary the composite symbol may provide the perception of a variety of planes. There will generally not be more than four levels of planar images perceived.

One or more of the symbols may be a hologram of an object. Such holograms cause light to reconstruct so as to give the viewer a perception of a three dimensional continuous object i.e. there is no planarity to the depth. Such holograms include holograms of objects or more complex holographic structures such as sterecholograms.

Such continuous three dimensional holographic symbols may be overlapped or juxtaposed with other symbols and/or with background graphical diffractive effects or indeed the illusion of a two dimensional graphical pattern intersecting the three dimensional object may be created.

In some cases, the symbols are presented against a background image. For example, beside the symbols, a less readily discernable background image may be provided comprising an individual image, logo or repetitive wording, if necessary presented in small print, sometimes called microlettering. Such microlettering may be provided in such a size that it is not immediately noticeable but revealable on close inspection aided by magnifying optics. This may provide a discrete, subtle visual feature. In addition the scale of the microlettering may be such that it is not adversely affected by crumpling as miniature uncrumpled areas leave the complete text unaffected.

The background image may apparently underlie each symbol and be discontinuous between them or a feint background image may stretch over the entire device.

The background image may be evenly plainly diffracting, finely patterned with miniature diffracting images, reflective metallic, tinted metallic, with the metallic film continuous and opaque or partial. The device background may also be translucent or transparent, with optional security indicia markings.

It is possible for each symbol presented in substantially identical representations to be overprinted with or incorporate a serial number or other character in miniature without affecting the viewer's impression that the symbols are different.

The device will generally be made of a tough but conformable plastics which has flexing and crumpling resistance. Generally, the device should have sufficient flexure such that when affixed to the surface on which it is intended to be used (eg a banknote) the bending of the surface is not significantly impaired nor is the device damaged. It is therefore desirable to employ as the substrate thin layers of tough but low molecular weight polyacrylates, polyesters, polycarbonates and the like.

Typically, the security device further comprises a heat or pressure sensitive adhesive carried by the substrate to enable the device to be fixed to a surface. In this connection, the device is preferably coated during manufacture with a heat or pressure sensitive adhesive and it is preferable that when applied to a surface of a document the adhesive penetrates a little below the surface for example between the paper fibres in the case of a paper document, so that the device cannot be peeled off without damage. It has been found that security devices according to the invention can be affixed to flexible substrates such as paper sheets without affecting the optical quality of the devices particularly if the paper has already been subjected to intaglio printing or calendaring compression so that the substrate is quite compact. This will generally be the case with banknotes. Additionally, or alternatively for surfaces which have not been intaglio printed, a varnish layer could be applied between the security device and the surface prior to hot stamping. The varnish layer also allows a higher level of durability and tamper resistance to be achieved.

The device can be applied to security printed items, primarily documents and the like which are printed on paper including cellulose, rag and synthetic such as non-woven and spun-bonded, or plastic or a combination, and which can be folded in use. Such documents are typically employed as banknotes, cheques (whether bank or travellers), bonds share certificates, licences, some types of identity cards, passports, visas tickets, passbooks, vouchers, deeds, tamper revealing seals and labels, brand authenticity labels and the like. The device may also of course be used on conventional plastic card materials such as relatively rigid PVC.

Some examples of authenticatable items and security devices according to the invention will now be described with reference to the accompanying drawings, in which.

Figure 1:
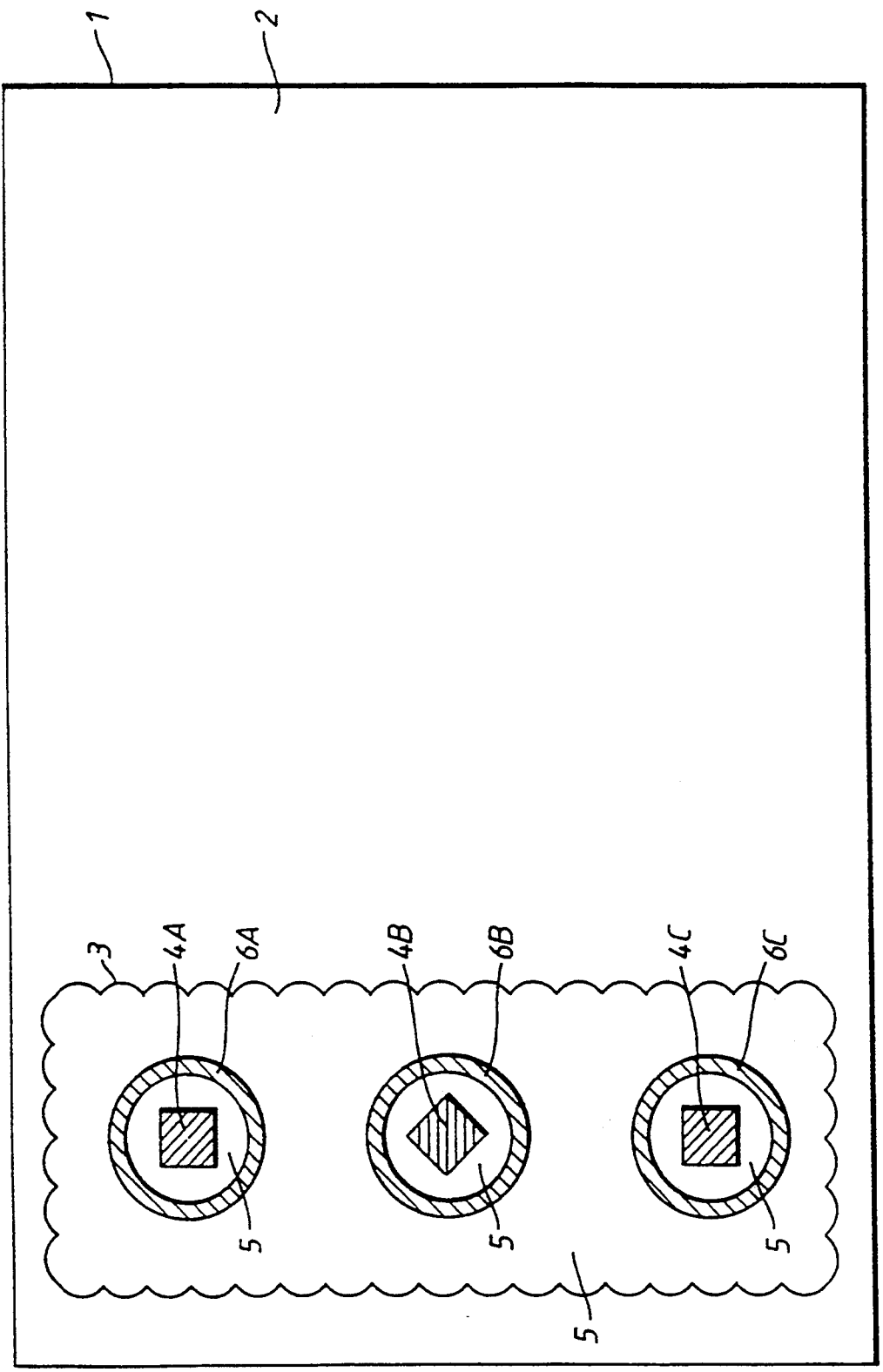
FIG. 1 represents a banknote bearing a first example of a security device.

In FIG. 1 there is shown a banknote 1 comprising a security printed substrate 2 onto which is affixed diffracting security device 3 which is in the form of a transparent diffractively embossed thermoplastic coating metallised on its under surface and adhered to the banknote.

The security device comprises three substantially identical identifiable symbols 4A, 4B and 4C, which present a common pictorial appearance at the same relative angle of inclination of viewing (i.e. at at least one inclined angle of viewing above the flat surface of the device). These symbols form a set of three and are plain strongly diffracting square areas set on a reflective silver appearing background 5.

The appearance of 4A, 4B and 4C is identical on viewing from a given angle of inclination from the flat plane of the banknote but not all three present their strongest appearance at a single banknote orientation. Rather they present the same appearance in regularly changing manner as the relatie orientation (rotation) of the banknote is altered within its plane. In this example, the angle subtended between the viewing directions of the strongest diffractive images of 4A and 4B is the same as the angle between 4B and 4C.

Annular rings surround the square areas, these rings 6A, 6B and 6C having a common pictorial appearance at one angle of inclination at one relative orientation. These annular rings form the second set.

The two sets are in relative register and are clustered or grouped to define three composite symbols but the symbols from one set do not overlap the symbols from the other set. The symbols are spaced apart by a perceptible distance.

As the viewing angles and orientations change so does the perceived composite image. At some angles and orientations both sets of symbols may not give the perception of diffraction. They may appear to have vanished. Symbols are determined by their pictorial content.

The perceived angular variability and image content of the symbols provides both visual interest and attractiveness in a manner which deters counterfeiting and forgery.

Using plain diffraction gratings the rainbow colour variation of the symbols which occurs as the angle of inclination is changed may be repeated as higher orders of light diffraction occur.

Figure 18:
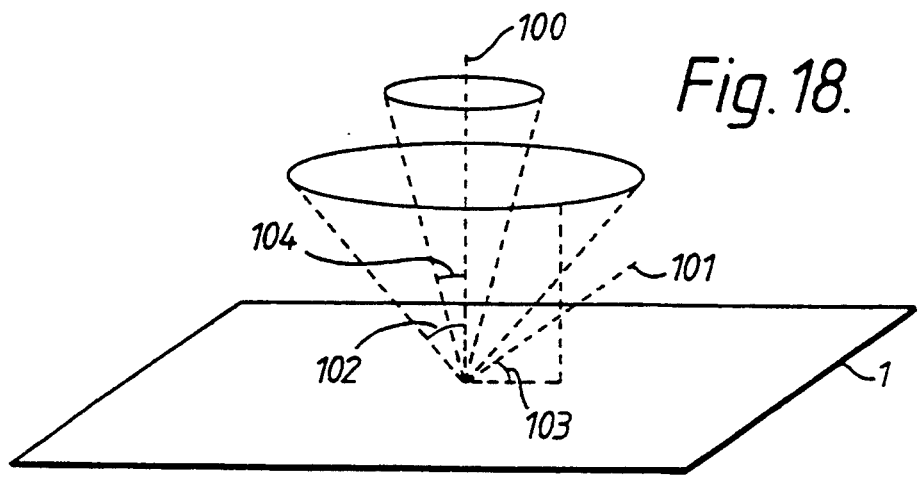
FIG. 18 illustrates the angular relationships involved.

FIG. 18 illustrates the relationship between the viewing angle of inclination and the angle of rotation for two, superposed symbols. FIG. 18 illustrates the banknote 1 and a pair of mutally orthogonal axes 100,101 are defined. The axis 100 is perpendicular to the plane of the banknote 1 while the axis 101 extends in the plane of the banknote parallel with the short sides of the banknote. A first symbol is viewable at an angle of inclination 102 to the axis 100. A second symbol of the same set is also viewable at an angle of inclination 102 but at a different angle of rotation 103 relative to the axis 101 from the angle of rotation at which the first symbol is viewable.

FIG. 18 also illustrates how a symbol of a second set is viewable at a different angle of inclination 104 to the axis 100.

Figure 2:
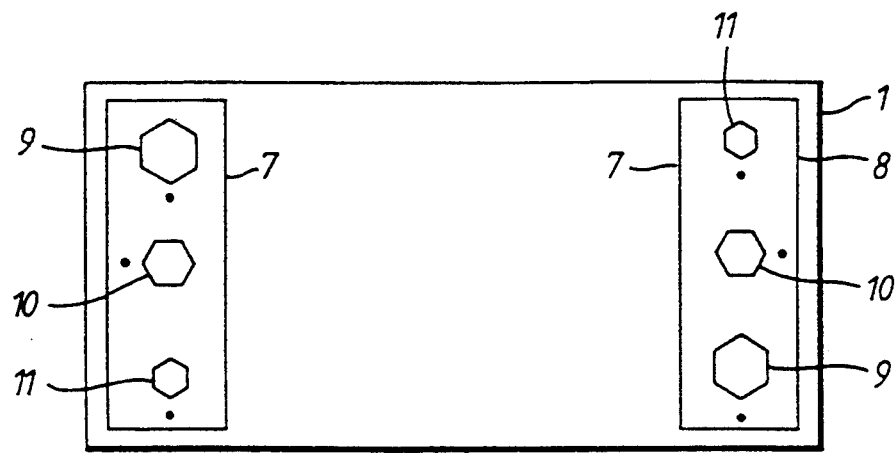
FIG. 2 represents a banknote bearing two security devices.

In FIG. 2 a banknote 1 comprises a security printed substrate 8 onto which are affixed by hot stamping two sets of symbols 7 each comprising three symbols 9-11 of regularly decrementing size. The symbols 9-11 have a similar shape but are scaled and are differently orientated reproductions of one another. The dots against one corner of the hexagons are merely to indicate orientation for the purposes of this Figure.

Figure 3:
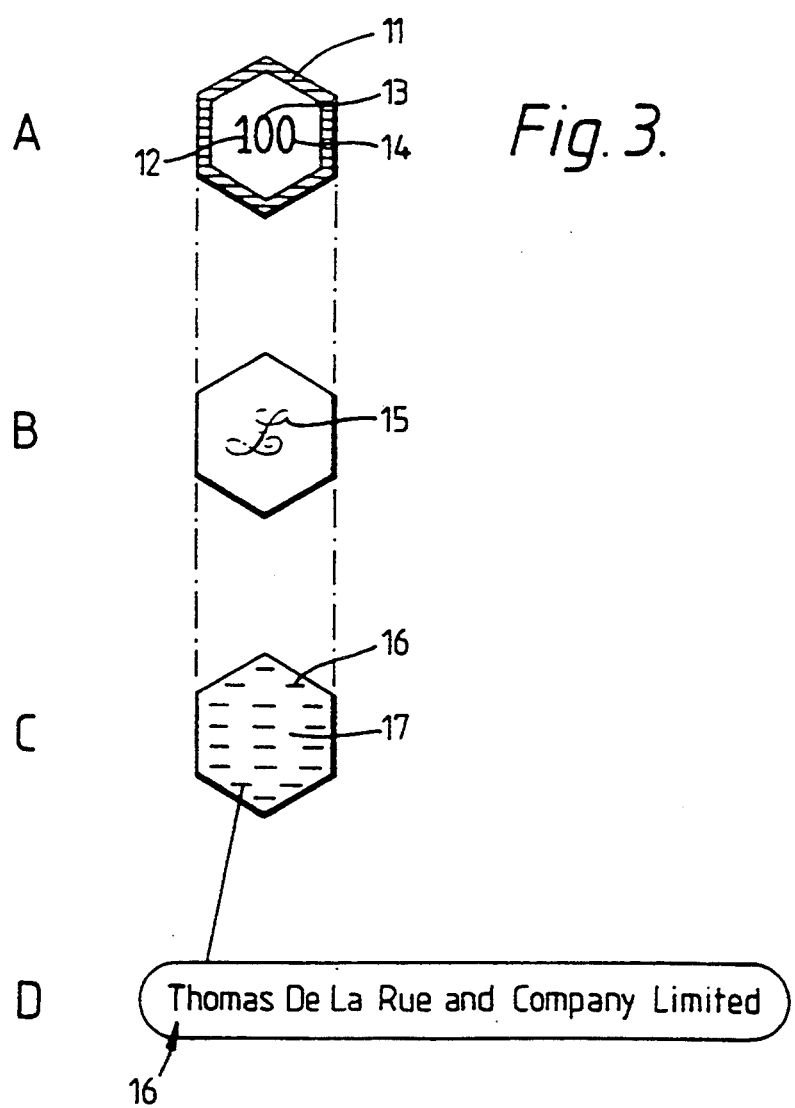
FIG. 3 represents the impression given to the viewer of one symbol of those used on the banknote of FIG. 2.

FIG. 3 illustrates the perception of one of the symbols which a viewer would obtain on examining the banknote of FIG. 2. While the symbol is physically planar except for the minutely contoured surface which gives rise to the diffraction of incoming white light, the perception to the viewer is of volume with there being a composite front foreground symbol as shown in FIG. 3A, a rear foreground symbol, apparently on an underlying plane as shown in FIG. 3B, with both of these foreground symbols set against an apparently more distant background image shown in FIG. 3C. The text employed in the background is shown magnified in FIG. 3D.

In FIG. 3A the boundary of the composite symbol is outlined by a symbol in the form of a uniformly diffracting band 11. As a further part of the composite front foreground symbol are numerical symbols 12, 13, 14 having a common diffracting appearance which differs from the appearance of the band 11.

Apparently underlying the composite front foreground symbol is a Sterling Pound symbol 15 exhibiting a yet further diffractive colour appearance as shown in FIG. 3B. As a background there are repeated lines of text 16 of a common but yet further diffracting appearance, readable only on magnification, set against a plainly reflecting background 17.

The magnified lines of repeating text 16 are illustrated in FIG. 3D.

On tilting the device to and from the viewer a variety of colours dependent on each symbol are seen, these colours changing in rainbow fashion as tilting occurs.

In the following description the perception of various types of optically variable image will be illustrated. FIGS. 4 to 11 show perspective views of a selection of individual apparent images resulting from diffraction of incoming light. In all of the Figures lines 18 are intended to be closer to the viewer than lines 19. This convention is shown only on FIG. 4 for clarity.

The area defined by the planes shown in FIGS. 4 to 11 corresponds to a single composite or individual symbol.

Figure 4:
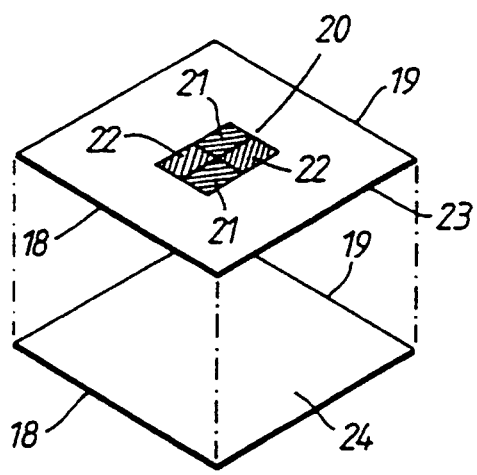
FIGS. 4 to 11 represent the perceptions of a variety of symbols.

In FIG. 4 is presented a duplex diffracting shape in the form of a square 20 which is made of two abutting, opposite pairs of computer generated patterned diffracting surfaces, 21 and 22. This is presented on a viewing plane 23 and against a background 24 which has a reflective metallic appearance. The resultant image appears flat, i.e. no perception of volume.

Figure 5:
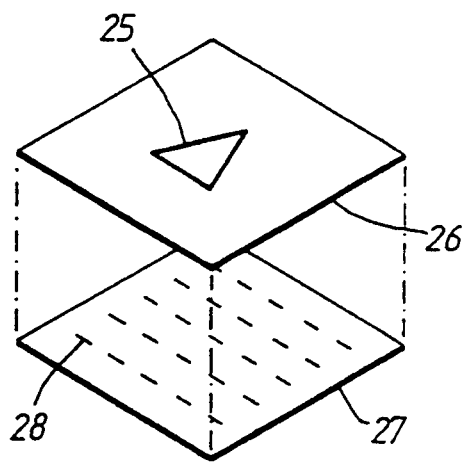

In FIG. 5 is presented a triangular band 25 of an optical catastrophe diffracting pattern forming a foreground symbol apparently on plane 26, set against a plane 27 which contains lines of small printing 28 (not shown enlarged) against an otherwise plain metallic background. The perceived image is of a triangle in front of a lettered background i.e. three dimensional perception is given in two planes.

Figure 6:
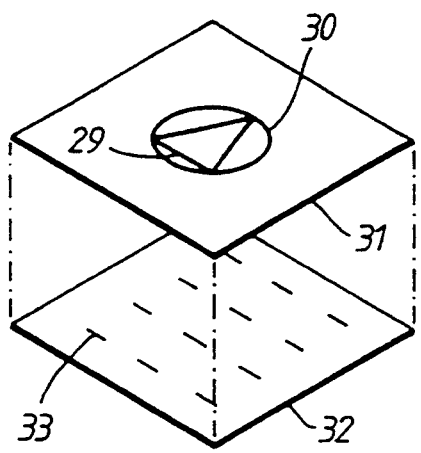

In FIG. 6 there is a triangular band 29 forming a first pixellated, multiply diffracting symbol merged with an annular band 30 forming a second plain diffracting symbol such that the triangular band and the annular band appear to have different colours. These two form a composite symbol and appear to be coplanar on foreground plane 31 and in front of a background in an apparently more distant plane 32 comprising segments of miniature lettering 33 (shown as lines), repeated on plain coloured background. The foreground plane 31 appears to be in front of plane 32.

Figure 7:
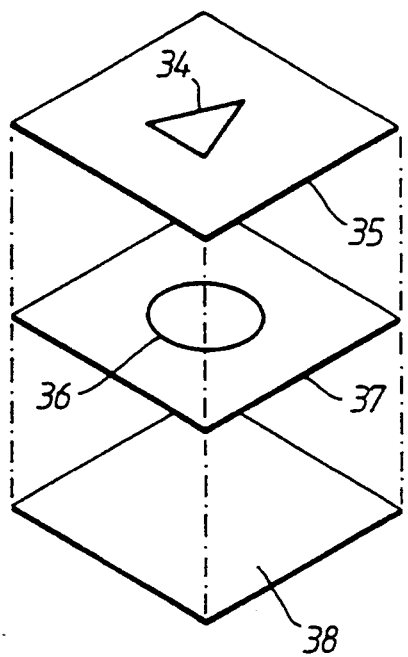

In FIG. 7 a triangular band 34 of a first pixellated, multiply diffracting symbol appears to lie in plane 35, which appears in front of an annulus 36 comprising a differently diffracting symbol apparently on a more distant plane 37. The annulus 36 and the triangular band 34 together form a composite symbol and are seen against a plain metallic background 38 which appears to be coplanar with the annulus. On viewing, the triangular band symbol appears to be in front of and concealing part of the annulus symbol. On tilting the device, the triangle and annulus may be seen to be in relative apparent movement. A perception of volume is given.

Figure 8:
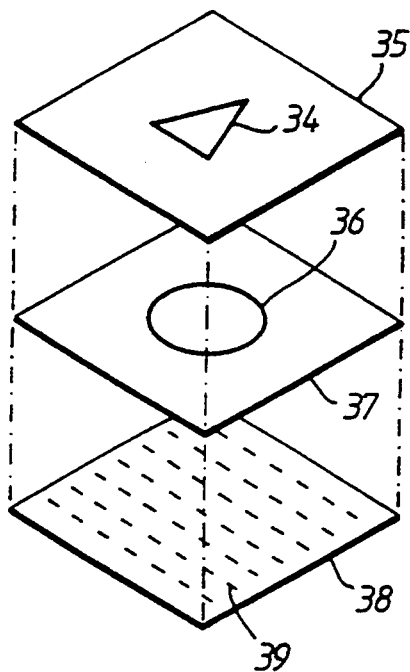

FIG. 8 is as FIG. 7 except that the background contains miniature lettering images 39 (shown as lines), multiply repeated.

Figure 9:
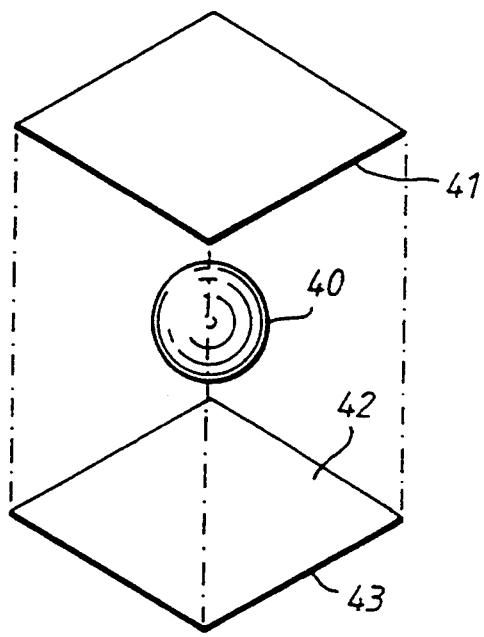

In FIG. 9 an object hologram symbol is shown in which there is the perception given of continuous, three dimensional object, illustrated by sphere 40. The object appears to lie under the surface of front plane 41 but in front of the plain background 42 of apparent plane 43.

Figure 10:
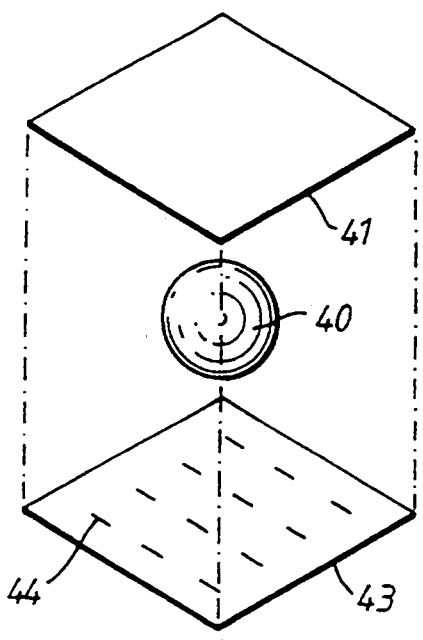

In FIG. 10 the hologram symbol of the object in FIG. 9 is set against a background of repeated miniature lettering 44 (shown as lines).

Figure 11:
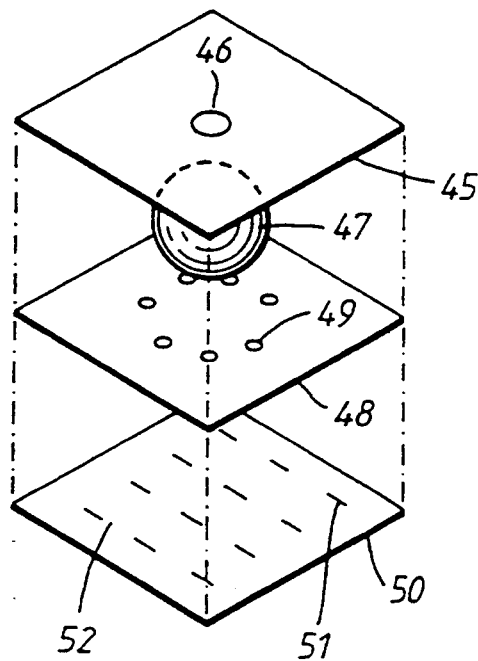

In FIG. 11 in the front foreground plane 45 there is a graphical diffracting symbol in the form of a small planar circle 46 which appears to be in front of the median foreground where the hologram symbol of a sphere 47 is presented. Behind that in plane 48 is an assembly of small circle symbols 49. The background plane 50 comprises miniature diffracting lettering 51 on a plain reflecting background 52. This composite symbol thus combines planar diffractive graphical images, an object hologram and background microprinting. All four may appear to be in relative movement if the device is tilted with rainbow colour changes being exhibited. The device is authenticated by reference to symbols 46, 47 and 49.

Figure 12:
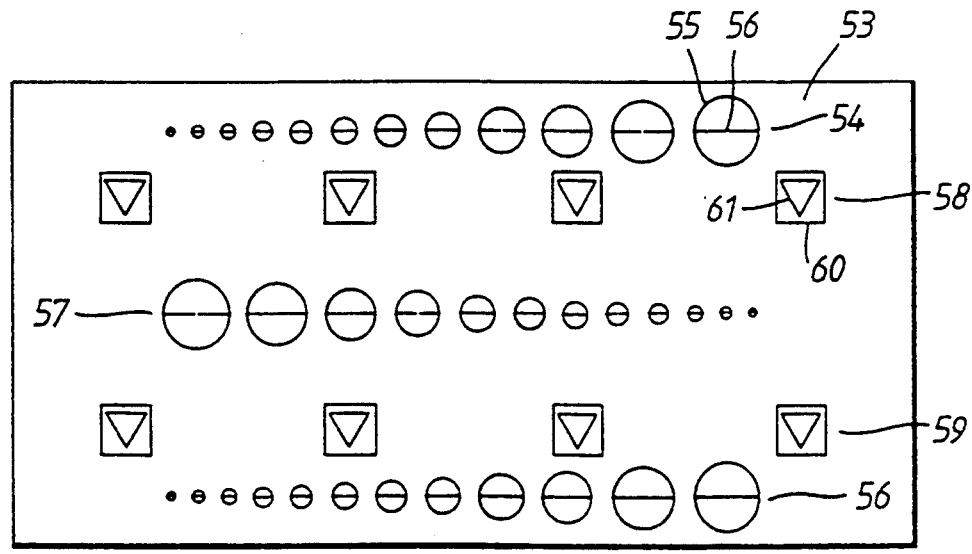
FIG. 12 represents a second example of a security device in accordance with the invention.

The security device shown in FIG. 12 contains a number of sets of symbols. The device is indicated generally at 53 and includes a first series of composite symbols 54 each of which has an outer, circular symbol 55A and an inner, horizontal line symbol 55B extending across a diameter of the circle symbol 55A. The composite symbols have the same appearance but decrease in size from right to left across the device. A similar second series of composite symbols 56 is provided in a lower part of the device while a third series of composite symbols 57 is provided extending across the centre of the device 53 but decreasing in size from left to right.

The device 53 includes fourth and fifth series of composite symbols 58, 59 arranged in two horizontal rows each of which comprises an outer square symbol 60 and an inner triangular symbol 61.

Figure 13:
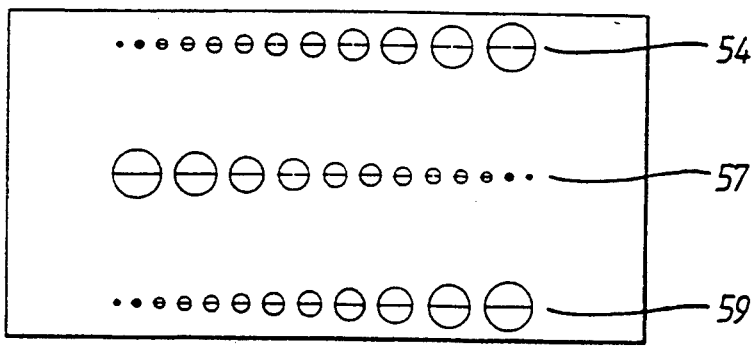
FIGS. 13 to 16 illustrate the appearance of the security device of FIG. 12 at different angles of tilting.
Figure 14:
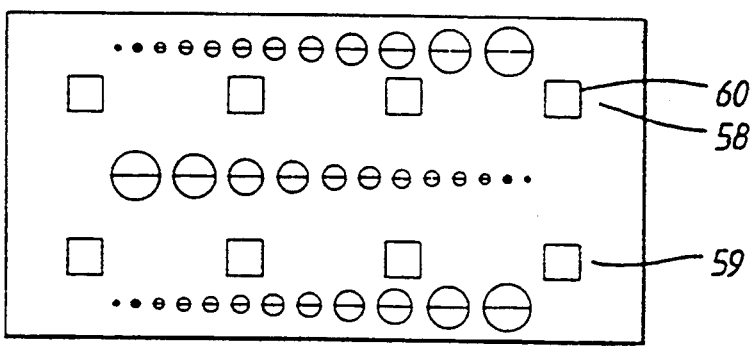
Figure 15:
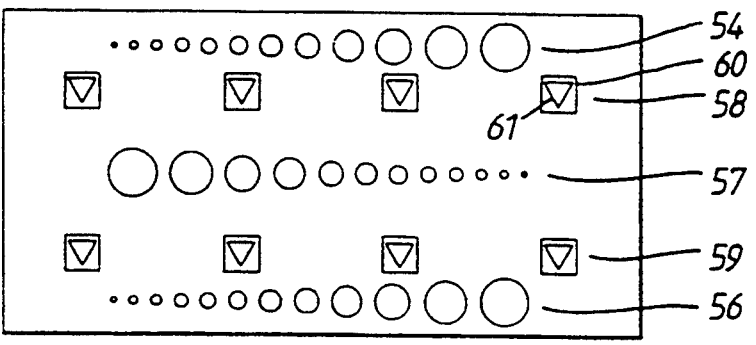
Figure 16:
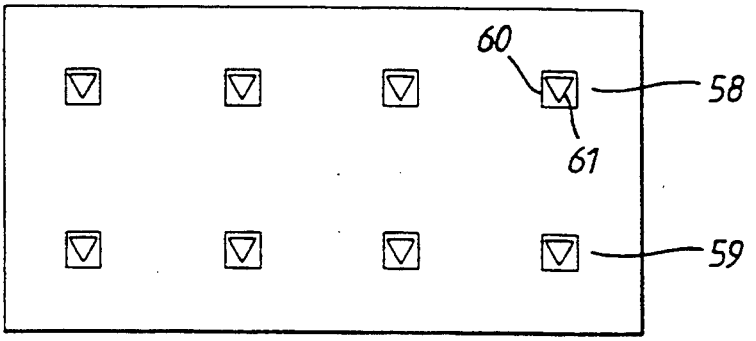

Although the device has been shown in FIG. 12 with all the symbols visible, in practice, at some viewing angles, only some or parts of the symbols will be visible. This is exemplified in FIGS. 13-16 for the device 53 of FIG. 12. At a first viewing angle of inclination (FIG. 13) only the first, second and third series of composite symbols 54, 57, 59 are visible although these sets are individually visible in their entirety. At a second viewing angle of inclination (FIG. 14) the square symbols 60 of the fourth and fifth series of composite symbols 58,59 become visible. At a third viewing angle of inclination (FIG. 15) the triangular symbols 61 within the fourth and fifth series of composite symbols 58, 59 become visible but the horizontal line symbols 55B of the first, second and third series of composite symbols 54,56,57 disappear. Finally, at a fourth viewing angle (FIG. 16) the first, second and third series of composite symbols 54,56,57 have disappeared while the fourth and fifth series of composite symbols 58,59 are fully visible. In this case the device is viewed at the same angle of rotation in each case.

Figure 17:
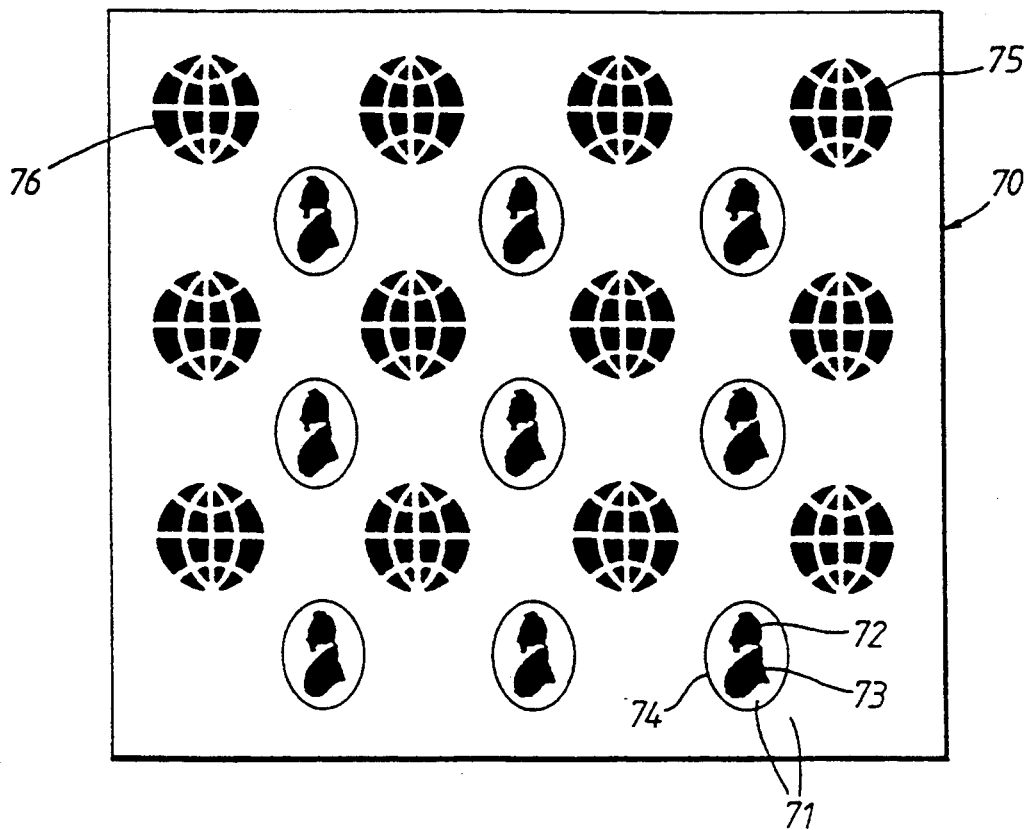
FIG. 17 illustrates a third example of a security device.

FIG. 17 illustrates a further example of a security device 70 mounted on a security printed substrate (not shown).

Here on a metallic reflecting background 71 head symbols 72 are formed from a first plain diffractive structure and shoulders symbols 73 from a second plain diffractive structure of the same type. Oval rings 74 are formed from a differently coloured plain diffractive structure. The composite symbol of head-shoulders-oval may be viewed from a variety of inclinations and at least one of the head-shoulders and oval images will be viewable from some angles and orientations of view and at other prominent viewing angles both the head-shoulders and the oval will be seen, although of different colours at those angles.

The head symbols 72 may be regarded as a first set of symbols, and the shoulders symbols 73 a second set. The oval symbols 74 and form a third set. These sets combine in register form a super set of the identifiable head-shoulders-oval composite pictorial image.

Intersecting with the nine members of the super set of symbols, is a different set comprising twelve pictorial symbols of a globe 75. These are formed from sixteen regularly placed diffracting portions 76.

All such sixteen diffractive portions have a common diffractive appearance when viewed from a common angle of incidence and common angle of orientation. The diffractive structures are such that diffraction is observed from the normal viewing orientation (i.e., as presented in the figure) but also by orientating (rotating) the note within its plane by ninety degrees.

The redundancy of the composition is such that the inspector could use head portions alone for identification, heads and shoulders, head-shoulders and oval, or head-shoulders-oval and globe.

A further example of a security device is shown in FIG. 19. In this case, four sets of symbols are provided. These comprise:

Set 1: "W" viewable at first inclination angle.
Set 2: "—" viewable at first angle of inclination.
Set 3: "W" viewable at second angle of inclination
Set 4: "—" viewable at second angle of inclination.

Figure 19A:
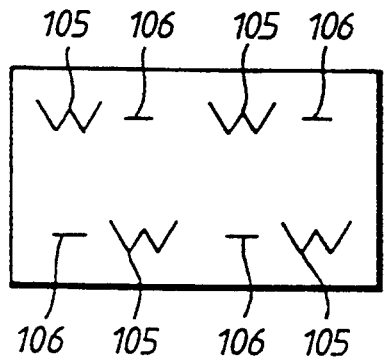
FIGS. 19A and 19B illustrate a fourth example of a security device.
Figure 19B:
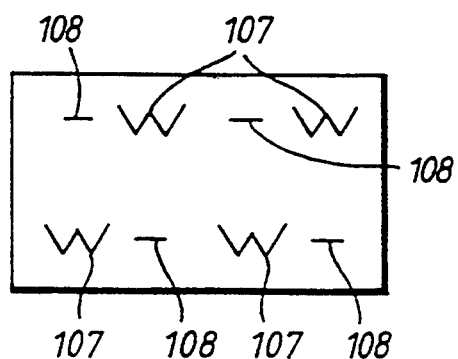

The symbols of the sets are arranged such that the symbols of sets 1 and 2 are interleaved as shown in FIG. 19A which illustrates a security device being viewed at the first angle of inclination, the symbols of the first set being labelled 105 and the symbols of the second set 106. The symbols of the third set are superposed upon the symbols of the second set and are illustrated at 107 in FIG. 19B which shows the security device being viewed at the second inclination angle. The symbols of the fourth set are superposed on the symbols of the first set as shown at 108 in FIG. 19B. As can be seen from FIG. 19, therefore, by tilting the security device between the first and second inclination angles, either the symbols of the first and second sets will be visible (FIG. 19A) or the symbols of the second set (FIG. 19B) with the result that there appears to be an attractive switching between the two types of symbols as the security device is tilted.

The security devices shown in the Figures can be used to authenticate a variety of substrates but are particularly suitable for application to flexible substrates such as paper and in particular banknotes (where the device could define a thread). Other applications include passport paper pages, plastic passport covers, visas, paper based identity cards, brand identification labels, antitamper labels—any visually authenticatable items.

In all these examples, the device typically comprises a plastics layer which has been impressed, typically embossed, on one surface with an optically diffracting pattern, the embossed surface then being partially or completely metallised. The metallised surface is then coated with a heat or pressure sensitive adhesive and the finished security device can then be applied to a substrate by hot stamping using, for example, shaped blocking dies. As explained above, there is little damage to the embossing or metallisation during the hot stamping process providing the substrate presents a suitable receiving surface. For example, intaglio printed banknotes have been found to be sufficiently compacted to receive security devices using a hot stamping technique but in addition or alternatively the substrate could be varnished. In the preferred examples, a hot stamping foil is provided carrying a multiplicity of symbols which are then hot blocked on to the surface to be secured. The hot stamping foil may employ sets of symbols which have to be applied in register with a feature on the substrate. Alternatively a so-called generic pattern of closely repeating images which have not be positioned in register, may be used.

Not only can the devices be in the form of hot stamping foils as described above but in addition holographically treated transfer foils, tapes with adhesive backing such as transferred pressure sensitive adhesive backing, threads and ribbons (such as security document e.g. "windowed" bank note threads) and tapes of label stock in which the shape of the labels may be regular such as a rectangle or of a specially designed outline can be used.

Due to the large number of symbols, even if the banknote carrying the device is crumpled, there will still be at least one of the symbols visible at any viewing angle. This enables the documents easily to be authenticated without having to be flattened out carefully prior to viewing.

In the case of embodiments which include holograms eg. of objects, the holograms should reconstruct in white light. Such white light viewable holograms, sometimes called rainbow holograms, are known in the art.

As the devices of the invention are tilted in white light it is common for rainbow colour changes also to be perceived, providing an extremely attractive effect.

I claim:

1. An authenticatable item carrying a number of symbols identifiable to the naked eye, there being at least two sets of at least three symbols, wherein all the symbols within a set are substantially identical, are positioned in a non-overlapping, regular geometric arrangement, and at at least one common viewing angle of inclination, exhibit substantially the same optical performance, the optical performance varying with inclination viewing angle.

2. A security device for mounting to an authenticatable item, the security device carrying a number of symbols identifiable to the naked eye, there being at least two sets of at least three symbols, wherein all the symbols within a set are substantially identical, are positioned in a non-overlapping, regular geometric arrangement, and at at least one common viewing angle of inclination, exhibit substantially the same optical performance, the optical performance varying with inclination viewing angle.

3. A device according to claim 2, further comprising a heat or pressure sensitive adhesive to enable the device to be fixed to a surface.

4. A device according to claim 2, wherein the device is such that it can be mounted on a flexible planar surface.

5. A device according to claim 2, wherein the symbols in a set vary regularly in their relative orientations.

6. A device according to claim 2, wherein the symbols in a set vary regularly in their relative sizes.

7. A device according to claim 6, wherein the symbols making up a set are arranged in a line with the sizes of successive symbols decreasing regularly along the line.

8. A device according to claim 2, wherein the appearance of the symbols results from a diffraction effect visible in white light.

9. A device according to claim 2, wherein the symbols in a set exhibit substantially the same optical performance at regularly spaced relative angles of rotation.

10. A device according to claim 2, wherein the symbols of one set are different from the symbols of the other set.

11. A device according to claim 2, wherein one symbol is common to both sets.

12. A device according to claim 2, wherein the item or device carries at least six symbols.

13. A device according to claim 2, wherein the symbols in a set are substantially equally spaced apart.

14. A device according to claim 2, wherein the symbols are identifiable to the unassisted naked eye.

15. A device according to claim 2, wherein the symbols of one set are interleaved with the symbols of the other set.

16. A device according to claim 2, wherein the symbols of the sets are juxtaposed so as to define a number of composite symbols.

17. A device according to claim 16, wherein one of the symbols comprises a closed contour which is positioned around at least one symbol of one or more other sets of symbols.

18. A device according to claim 17, wherein the symbols making up the composite symbol exhibit differently varying optical performances as the viewing angle of inclination varies.

19. A device according to claim 2, wherein each symbol of one set overlaps at most one symbol of the other set.

20. A device according to claim 2, wherein the symbols of the two sets exhibit mutually opposed variations in optical performance as the viewing angle of inclination varies.

21. A device a according to claim 2, wherein the symbols are presented against a background image.

22. A device according to claim 21, wherein the background image is diffracting.

23. A device according to claim 2, wherein at least some of the symbols present the appearance of a pair of two dimensional images which move relative to one another as the viewing angle of inclination varies.

24. A device according to claim 2, wherein at least some of the symbols present a three-dimensional object in the form of an object hologram.

25. An authenticatable item carrying a security device according to claim 2, wherein a layer of varnish is provided on the item underneath the device.

26. An authenticatable item according to claim 1, wherein the item comprises a security document.

27. An item according to claim 26, wherein the security document is a banknote.

28. A method of manufacturing a security device carrying a number of symbols identifiable to the naked eye, there being at least two sets of three symbols, wherein all the symbols within a set are substantially identical, are positioned in a non-overlapping, regular geometric arrangement, and at at least one common viewing angle of inclination, exhibit substantially the same optical performance, the optical performance varying with inclination viewing angle, the method comprising providing on a substrate a number of symbols identifiable to the naked eye, there being at least two sets of at least three symbols, wherein all the symbols within a set are substantially identical, are positioned in a non-overlapping regular geometric arrangement, and at at least one common viewing angle of inclination, exhibit substantially the same optical performance, the optical performance varying with inclination viewing angle.

29. A method according to claim 28, wherein the symbols are provided by impressing a diffraction structure on to the substrate.

30. A method according to claim 28, wherein the substrate comprises a hot stamping foil from which individual security devices can be blocked.

31. A shim for use in manufacturing a diffractive security device, the shim having a surface relief pattern which can be impressed into a substrate and is constructed so as to impress a corresponding surface relief pattern in the substrate and define said diffractive security device which carries a number of symbols identifiable to a naked eye, there being at least two sets of at least three symbols, wherein all the symbols within a set are substantially identical, are positioned in a non-overlapping, regular geometric arrangement, and at at least one common viewing angle of inclination, exhibit substantially the same optical performance, the optical performance varying with inclination viewing angle.

* * * * *